(12) United States Patent
Kim

(10) Patent No.: US 12,395,950 B2
(45) Date of Patent: Aug. 19, 2025

(54) COMMUNICATION NODE AND METHOD OF OUTPUTTING SYNCHRONIZATION SIGNAL IN THE SAME

(71) Applicant: SOLiD, INC., Seongnam-si (KR)

(72) Inventor: Ok Jin Kim, Seongnam-si (KR)

(73) Assignee: SOLiD, INC., Seongnam-si (KR)

( * ) Notice: Subject to any disclaimer, the term of this patent is extended or adjusted under 35 U.S.C. 154(b) by 492 days.

(21) Appl. No.: 17/834,377

(22) Filed: Jun. 7, 2022

(65) Prior Publication Data

US 2022/0408386 A1    Dec. 22, 2022

(30) Foreign Application Priority Data

Jun. 21, 2021    (KR) .................. 10-2021-0079808

(51) Int. Cl.
| | |
|---|---|
| *H04W 56/00* | (2009.01) |
| *H04W 72/02* | (2009.01) |
| *H04W 72/0453* | (2023.01) |
| *H04W 72/1273* | (2023.01) |
| *H04W 72/52* | (2023.01) |

(52) U.S. Cl.
CPC ......... *H04W 56/001* (2013.01); *H04W 72/02* (2013.01); *H04W 72/0453* (2013.01); *H04W 72/52* (2023.01); *H04W 56/0015* (2013.01); *H04W 72/1273* (2013.01)

(58) Field of Classification Search
CPC .............. H04W 56/001; H04W 72/02; H04W 72/0453; H04W 72/52; H04W 56/0015; H04L 5/14; H04L 27/2602; H04L 27/261; H04L 5/0042; H04L 5/0051; H04L 5/0053; H04L 5/0091; H04L 5/0048; H04L 27/2657; H04L 5/0007; H04L 27/26025; H04L 27/2666; Y02D 30/70
See application file for complete search history.

(56) References Cited

U.S. PATENT DOCUMENTS

| | | | |
|---|---|---|---|
| 10,411,940 B2* | 9/2019 | Ko | H04W 72/0453 |
| 10,798,695 B2* | 10/2020 | Kim | H04B 7/0695 |
| 11,582,806 B2* | 2/2023 | Yan | H04W 72/23 |
| 11,658,778 B2* | 5/2023 | Fehrenbach | H04L 5/0064 370/329 |
| 11,930,481 B2* | 3/2024 | Oh | H04W 72/0453 |

(Continued)

FOREIGN PATENT DOCUMENTS

| | | |
|---|---|---|
| CN | 109120390 A | 1/2019 |
| KR | 10-2019-0017641 A | 2/2019 |
| WO | 2018/204285 A1 | 11/2018 |

OTHER PUBLICATIONS

Extended European Search Report dated Oct. 25, 2022 in European Application No. 22178037.2.

(Continued)

*Primary Examiner* — Brian T O Connor
(74) *Attorney, Agent, or Firm* — Sughrue Mion, PLLC

(57) ABSTRACT

Provided is a method of outputting a synchronization signal in a communication node comprising: receiving communication connection information from a terminal, identifying detectable position information of a synchronization signal block (SS block) included in the communication connection information, setting a position of the SS block based on the identified detectable position information, and outputting the SS block based on the set position.

10 Claims, 7 Drawing Sheets

(56) References Cited

U.S. PATENT DOCUMENTS

| | | | |
|---|---|---|---|
| 11,962,438 B2* | 4/2024 | Tsui | .................... H04B 7/0417 |
| 12,052,722 B2* | 7/2024 | Sato | ................. H04W 72/1268 |
| 2018/0367985 A1 | 12/2018 | Novlan et al. | |
| 2020/0127755 A1* | 4/2020 | Ko | ....................... H04J 11/0069 |
| 2020/0314777 A1* | 10/2020 | Liu | .................. H04W 72/0446 |
| 2021/0368534 A1* | 11/2021 | Sato | .................... H04W 72/569 |
| 2022/0046644 A1* | 2/2022 | Oh | ........................ H04L 5/0048 |
| 2023/0345486 A1* | 10/2023 | Kim | ................. H04W 56/0015 |

OTHER PUBLICATIONS

ITL, "Multiple SS block indication in wideband CC", 3GPP TSG RAN WG1 NR Ad-Hoc#2, Jun. 27-30, 2017, R1-1711352, Qingdao, P.R. China (5 pages total).

* cited by examiner

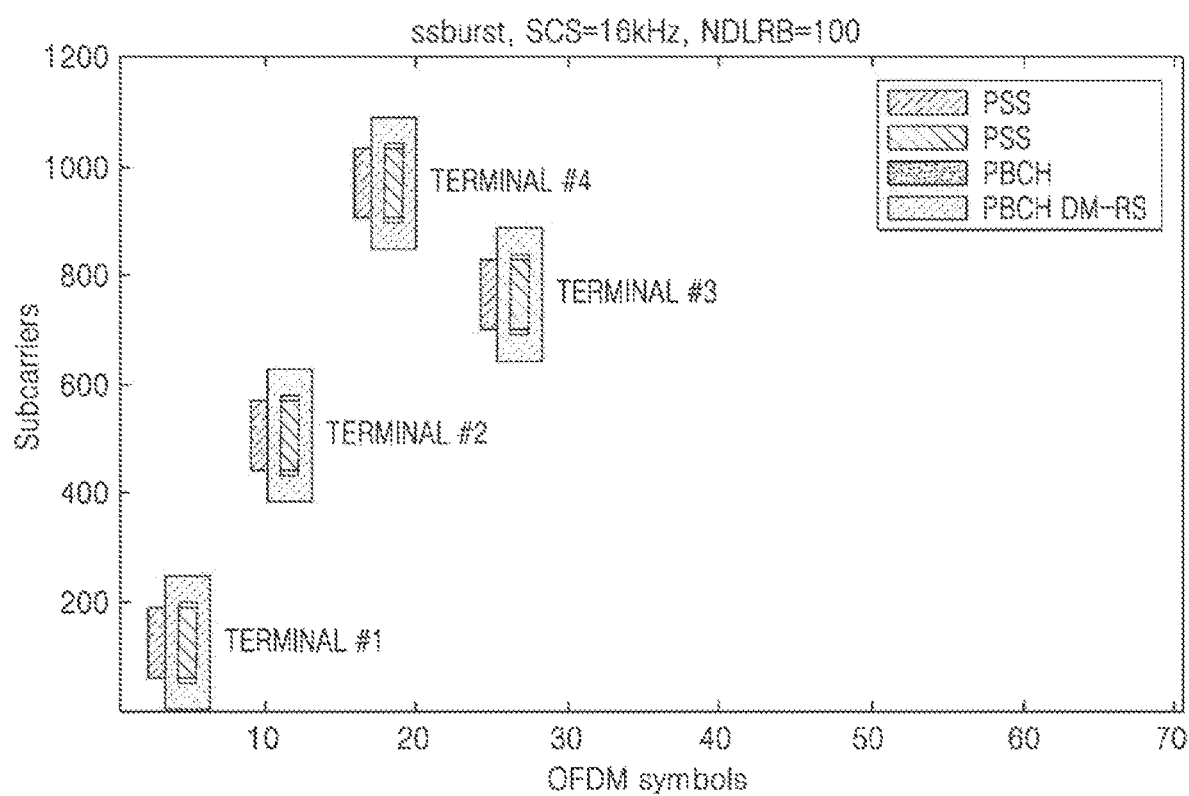

COMMUNICATION NODE AND METHOD OF OUTPUTTING SYNCHRONIZATION SIGNAL IN THE SAME

CROSS-REFERENCE TO RELATED APPLICATION

This application claims the benefit of Korean Patent Application No. 10-2021-0079808, filed on Jun. 21, 2021, in the Korean Intellectual Property Office, the disclosure of which is incorporated herein in its entirety by reference.

BACKGROUND

1. Field

The disclosure relates to a communication node and method of outputting a synchronization signal in the communication node.

2. Description of the Related Art

Since around 2019 when fifth generation (5G) new radio (NR) terminals were supplied, 5G mobile communication has been commercially used. The 5G NR employs a time division duplexing (TDD) scheme, which makes it necessary to perform time synchronization between a terminal and a base station (or repeater). For the time synchronization, the terminal needs to obtain a synchronization signal block (SS block) output from the base station or repeater and attain synchronization by identifying a primary synchronization signal (PSS) and a secondary synchronization signal (SSS) included in the SS block.

In traditional long term evolution (LTE), the SS block is always located at a center frequency, so the synchronization may be attained by calculating a correlation only for the PSS and SSS bands of the center frequency. On the other hand, in the 5G NR, the position of the SS block is no longer fixed, and the position of the SS block may be freely adjusted. In this case, however, when the SS block having a different position for each communication operator is output, the terminal needs to be equipped with hardware capable of processing wideband signals to support various frequency bands for the SS block, so the cost and power consumption of the terminal may increase. In addition, the existing terminals having hardware capable of processing only narrowband signals may no longer access the communication system such as the base station.

SUMMARY

The disclosure provides a communication node enabling terminals to access and communicate therewith according to respective communication specifications of the terminals, and a method of outputting a synchronization signal in the communication node.

The disclosure also provides a communication node capable of using frequency bands for mobile communication more efficiently, and a method of outputting a synchronization signal in the communication node.

According to an aspect of an embodiment, a method of outputting a synchronization signal in a communication node comprising: receiving communication connection information from a terminal; identifying detectable position information of a synchronization signal block (SS block) included in the communication connection information; setting a position of the SS block based on the identified detectable position information; and outputting the SS block based on the set position.

According to an exemplary embodiment, the setting of the position of the SS block comprises setting a position of the SS block so that the SS block is output at a frequency included in a frequency band corresponding to the detectable position information.

According to an exemplary embodiment, the setting of the position of the SS block comprises setting an orthogonal frequency division multiplexing (OFDM) symbol position and a subcarrier position of the SS block so that the SS block is output at a frequency included in a frequency band corresponding to the detectable position information.

According to an exemplary embodiment, the setting of the position of the SS block comprises, when a plurality of frequency bands corresponding to the detectable position information are identified, selecting a frequency band based on a load of each of the plurality of frequency bands or whether each frequency band is occupied by another terminal, and setting a position of the SS block so that the SS block is output at a frequency included in the selected frequency band.

According to an exemplary embodiment, the communication connection information comprises at least one of frequency-in-use information and available bandwidth information of the terminal.

According to an exemplary embodiment, the method further comprises allocating a communication resource for communication with the terminal based on at least one of the frequency-in-use information and the available bandwidth information included in the communication connection information.

According to an exemplary embodiment, the communication node comprises a base station or a repeater.

According to an aspect of an embodiment, a communication node comprising: a terminal information receiver configured to receive communication connection information from a terminal; a terminal information processor configured to obtain detectable position information of a synchronization signal block (SS block) by processing the received communication connection information; and an SS block output adjuster configured to adjust a position of the SS block for the terminal based on the detectable position information.

BRIEF DESCRIPTION OF THE DRAWINGS

The above and other features and advantages of the disclosure will become more apparent by describing in detail exemplary embodiments thereof with reference to the attached drawings in which:

FIG. 5 illustrates an arrangement of SS blocks placed by a communication node based on a method of outputting a synchronization signal, according to an embodiment of the disclosure;

DETAILED DESCRIPTION

Figure 1:
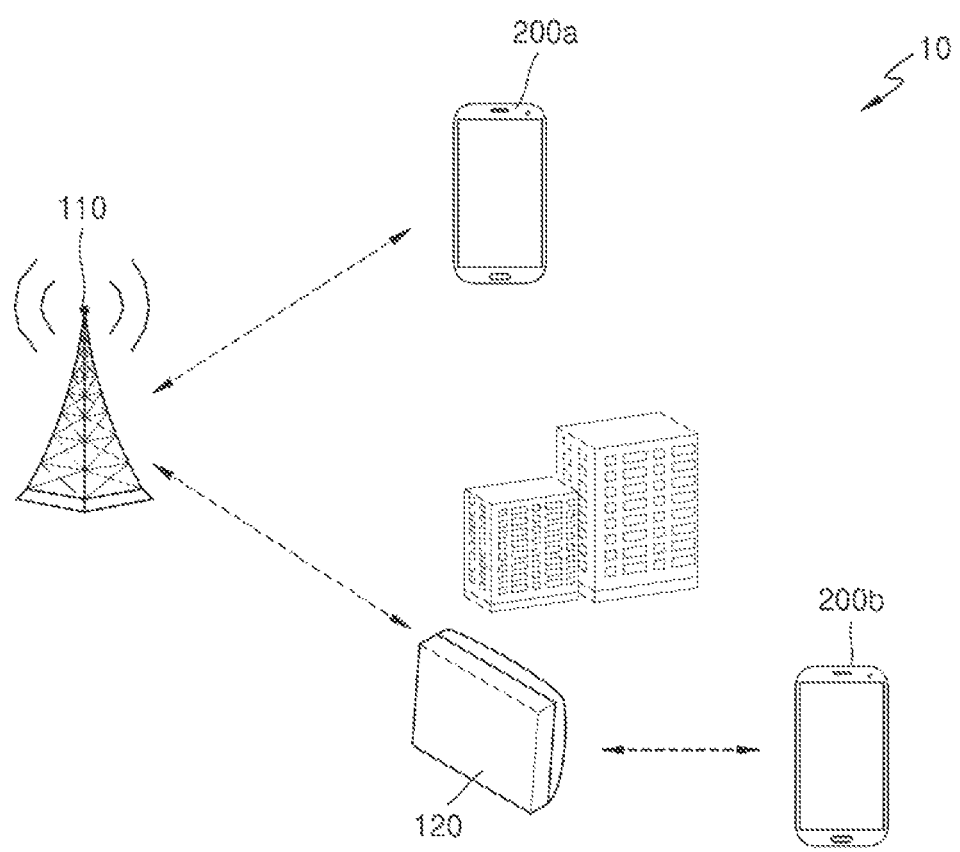
FIG. 1 is a conceptual diagram of a communication system, according to an embodiment of the disclosure.

Embodiments of the disclosure are provided to more fully explain the technical idea of the disclosure for those of ordinary skill in the art. The scope of the disclosure is not limited to the following embodiments of the disclosure, and various forms of modification can be made to the following embodiments of the disclosure without departing from the scope of the disclosure. The embodiments are provided to make the disclosure fully and completely understood and to fully convey the technical idea of the disclosure to those of ordinary skill in the art.

In the disclosure, the terms first, second, etc., are used to describe various members, areas, layers, portions and/or components, but it is obvious that the members, areas, layers, portions and/or components should not be limited by the terms. The terms do not imply a specific order, ranks or priorities, but are used to distinguish a member, area, portion, or component from another. Accordingly, a first member, area, portion, or component may also be referred to as a second member, area, portion, or component, without departing from the teachings of the disclosure. For example, a first component may be termed a second component, and a second component may be termed a first component, without departing from the teachings of the disclosure.

Unless otherwise defined, all the terms as herein used have the same meanings as those commonly understood by the ordinary skill in the art to which the disclosure pertains, including technical and scientific terms. Furthermore, the terms as commonly used and defined in the dictionary should be construed as having the same meaning as they imply in the context of relevant technologies, and unless explicitly defined, should not be interpreted in an overly formal sense.

A procedure performed in a particular sequence in an embodiment of the disclosure may be performed in a different sequence in another embodiment of the disclosure. For example, two processes described successively may be performed at substantially the same time or in a reversed sequence.

As for accompanying drawings, for example, it may be appreciated that the forms shown in the drawings may be changed according to a manufacturing technique and/or tolerance. Accordingly, embodiments of the disclosure should not be limited to specific forms as illustrated in the accompanying drawings. For example, embodiments of the disclosure encompass changes of forms caused in a manufacturing process. In the drawings, like reference numerals indicate like elements, so overlapping description thereof will not be repeated.

The expression "A and/or B" as herein used includes each of A and B and both A and B.

Embodiments of the disclosure will now be described in detail with reference to accompanying drawings.

Figure 2:
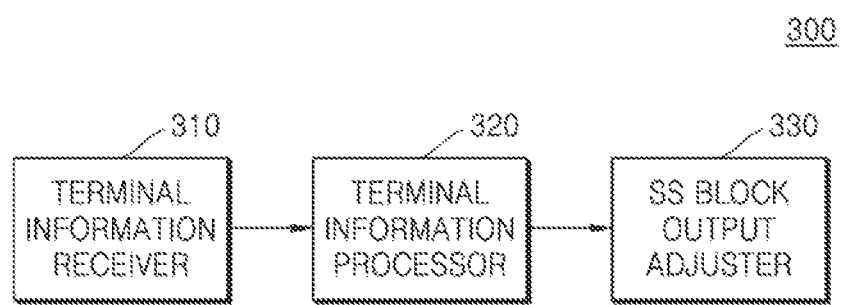
FIG. 2 is a block diagram of a portion of a communication node, according to an embodiment of the disclosure.

FIG. 1 is a conceptual diagram of a communication system, according to an embodiment of the disclosure. FIG. 2 is a block diagram of a portion of a communication node, according to an embodiment of the disclosure.

Referring to FIG. 1, a communication system 10 according to an embodiment of the disclosure may include a base station (BS) 110, a repeater 120, and at least one terminals (or user equipments (UEs)) 200a and 200b (hereinafter, collectively denoted by '200'). In another embodiment of the disclosure, the communication system 10 may not include the repeater 120.

The BS 110 may provide a communication service according to a mobile communication standard. For example, the BS 110 may provide a fifth generation (5G) mobile communication service such as 5G new radio (NR). In another embodiment of the disclosure, the BS 110 may also provide an old mobile communication service (e.g., a long term evolution (LTE) or LTE-advanced (LTE-A) service) as well as the 5G mobile communication service. The BS 110 may transmit or receive a communication signal directly to or from a terminal 200a within its coverage or transmit or receive a communication signal to or from a terminal 200b via a repeater 120 arranged in a shadow area such as in a building or underground. The BS 110 may include not only a macro cell but also small cells such as low-power BS equipment, a pico cell, a femto cell, etc.

The repeater 120 may relay communications between the BS 110 and the terminal 200b. The repeater 120 may be installed in a shadow area such as in a building or underground in which communication signals from the BS 110 are not smoothly received, without being limited thereto.

In an embodiment of the disclosure, the repeater 120 may relay communication signals in a 5G mobile communication network such as 5G NR, but is not limited thereto. For example, the repeater 120 may relay communication signals in a communication network including a combination of the 5G mobile communication network and a fourth generation (4G) mobile communication network such as LTE or LTE-A network.

The repeater 120 may receive a communication signal transmitted from the BS 110 (e.g., a BS signal), and relay the communication signal (e.g., the BS signal) to the terminal 200b located in the coverage of the repeater 120. The communication signal may be a radio communication signal (e.g., a radio frequency (RF) signal). In an embodiment of the disclosure, the communication signal may be a communication signal that conforms to a 5G NR standard.

For example, in an embodiment of the disclosure, the repeater 120 may include a remote unit (RU) of a distributed antenna system (DAS), a distributed unit (DU) or a remote radio unit (RRU) of an open radio access network (O-RAN), or other various types of repeater known to the public.

Although the repeater 120 is shown in FIG. 1 as relaying communications between one BS 110 and one terminal 200b for convenience of explanation, the repeater 120 may relay communications between a plurality of BSs and a plurality of terminals. In another embodiment of the disclosure, the repeater 120 may relay communications between the BS 110 and another repeater (not shown).

The terminal 200 may use a communication service by accessing the BS 110 or the repeater 120. In the 5G NR, a TDD scheme is used, in which case time synchronization between the terminal 200 and the BS 110 (or the repeater 120) is required. For this, the BS 110 or the repeater 120 may periodically output a synchronization signal block (SS block). The terminal 200 may receive the SS block and attain synchronization based on a primary synchronization signal (PSS) and a secondary synchronization signal (SSS) included in the SS block.

In traditional LTE, a position of the SS block is fixed at a center frequency, so the synchronization may be attained by calculating a correlation only for the PSS and SSS bands of the center frequency. On the other hand, in the 5G NR, the position of the SS block is not fixed, and the SS block is arranged and output in a different position for each communication operator. In this case, problems may arise in that the terminal 200 needs to be equipped with hardware capable of processing wideband signals to support various frequency bands and the existing terminals capable of processing only narrowband signals may not access the communication system.

In the disclosure, each terminal 200 may be configured to output information for communication connection, instead of the BS 110 or the repeater 120 arranging and outputting the SS block at a preset position. The BS 110 or the repeater 120 may identify a position of the SS block that may be detected by each terminal 200 from the information output by the terminal 200, and may allocate and output the SS block in the identified position each.

Referring to FIG. 2, a communication node 300 may include a terminal information receiver 310, a terminal information processor 320 and an SS block output adjuster 330. The communication node 300 may correspond to the BS 110 or the repeater 120 as shown in FIG. 1. The components shown in FIG. 2 may be implemented by using hardware such as at least one processor (not shown), a communication device (circuit), etc., included in the communication node 300. The components of the communication node 300 are not, however, limited to what are shown in FIG. 2, and the communication node 300 may include a lot more components.

The terminal information receiver 310 may receive communication connection information output from the terminal 200. The communication connection information may include information about a communication available frequency and available bandwidth, detectable position information (e.g., frequency band) of the SS block, etc. The communication connection information may be output by the terminal 200 during initial access to the communication node 300, but in some embodiments of the disclosure, the terminal 200 may periodically output the communication connection information.

The terminal information processor 320 may obtain the aforementioned various information by processing the received communication connection information. The SS block output adjuster 330 may adjust the position of the SS block according to the detectable position information of the SS block of the terminal 200 obtained from the communication connection information. The communication node 300 may enable the terminal 200 to receive the SS block by outputting the SS block based on the adjusted position.

Operations of a communication system according to embodiments of the disclosure will now be described in more detail with reference to FIGS. 3 to 7.

Figure 3:
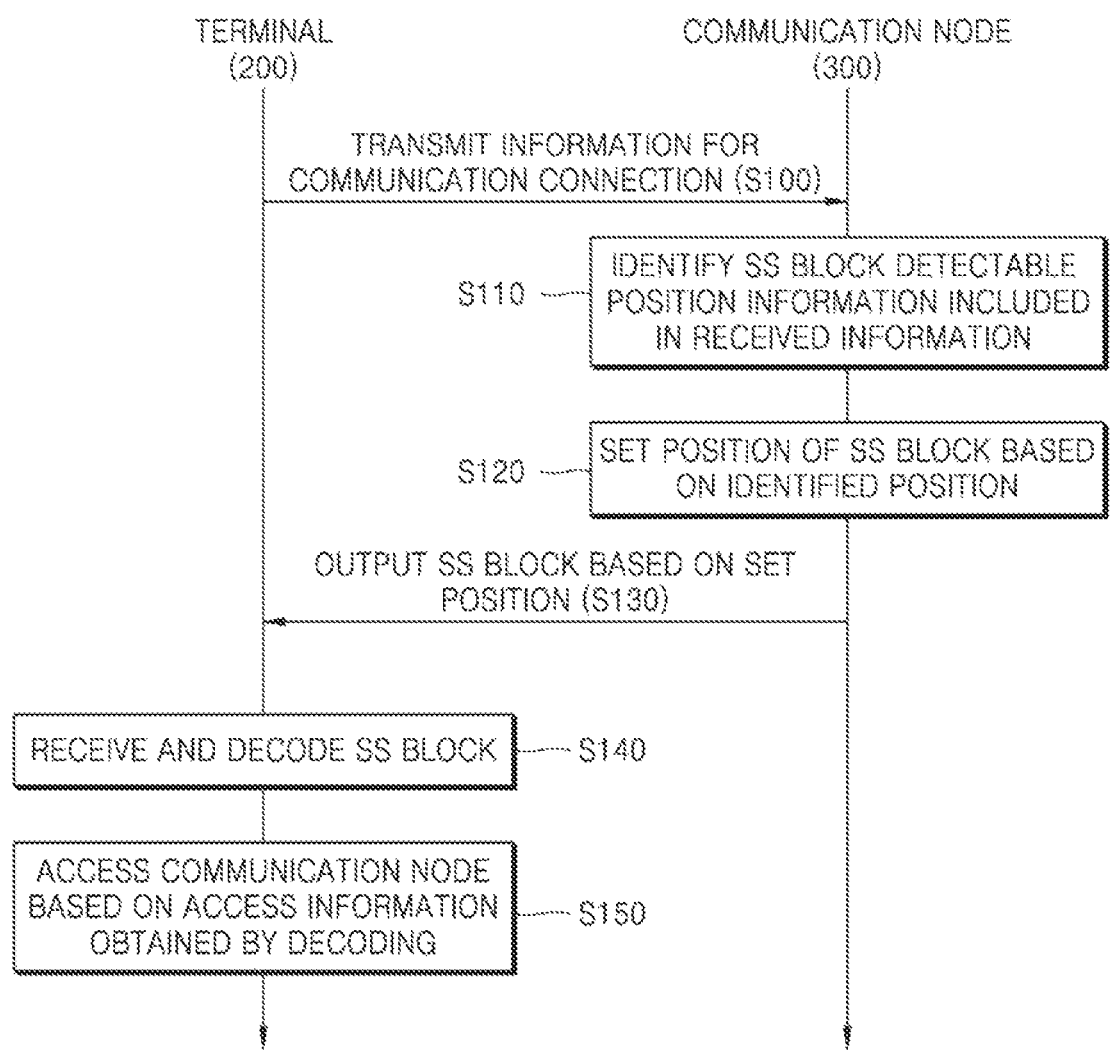
FIG. 3 is a ladder diagram for describing operations of a communication system, according to an embodiment of the disclosure.
Figure 4:
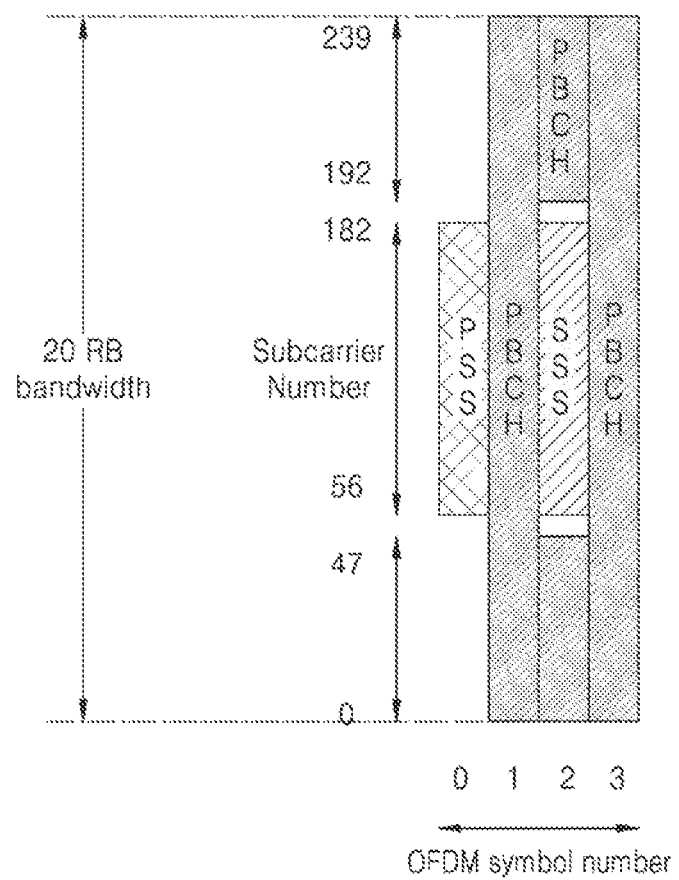
FIG. 4 illustrates a synchronization signal block (SS block) output from a communication node.
Figure 6A:
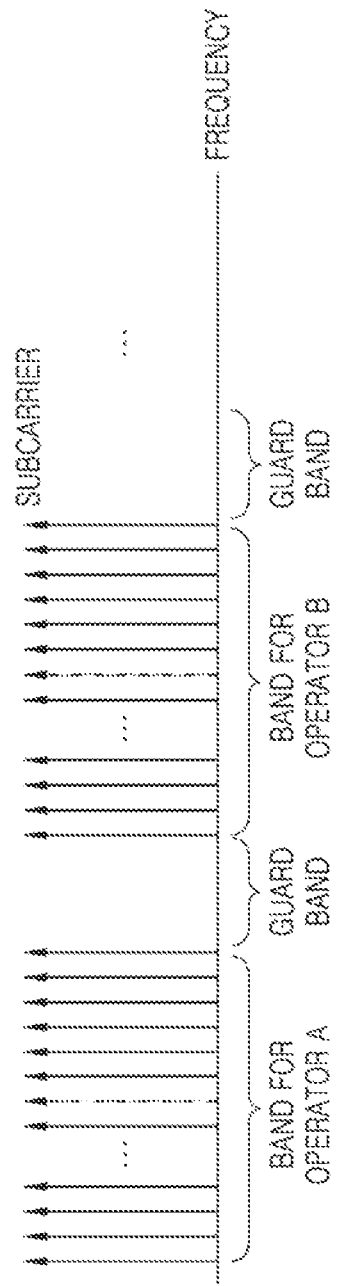
FIGS. 6A and 6B are diagrams for comparing a frequency band allocation form according to an embodiment of the disclosure and a frequency band allocation form according to a traditional mobile communication method.
Figure 6B:
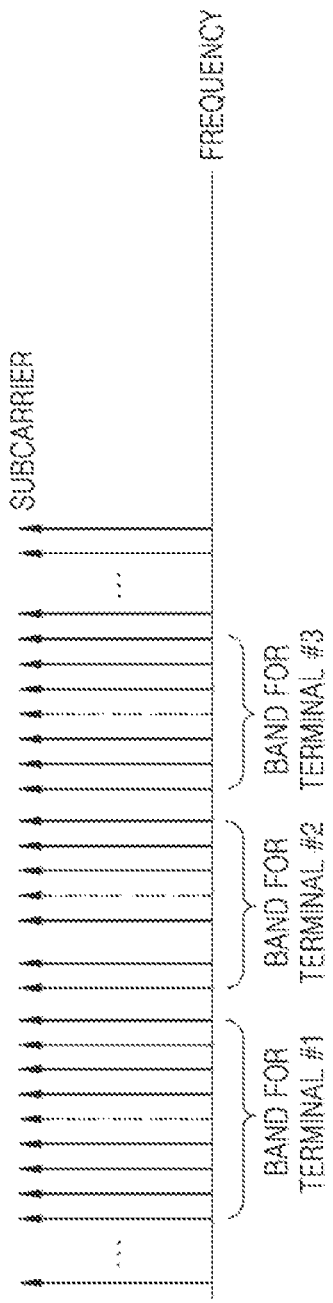
Figure 7:
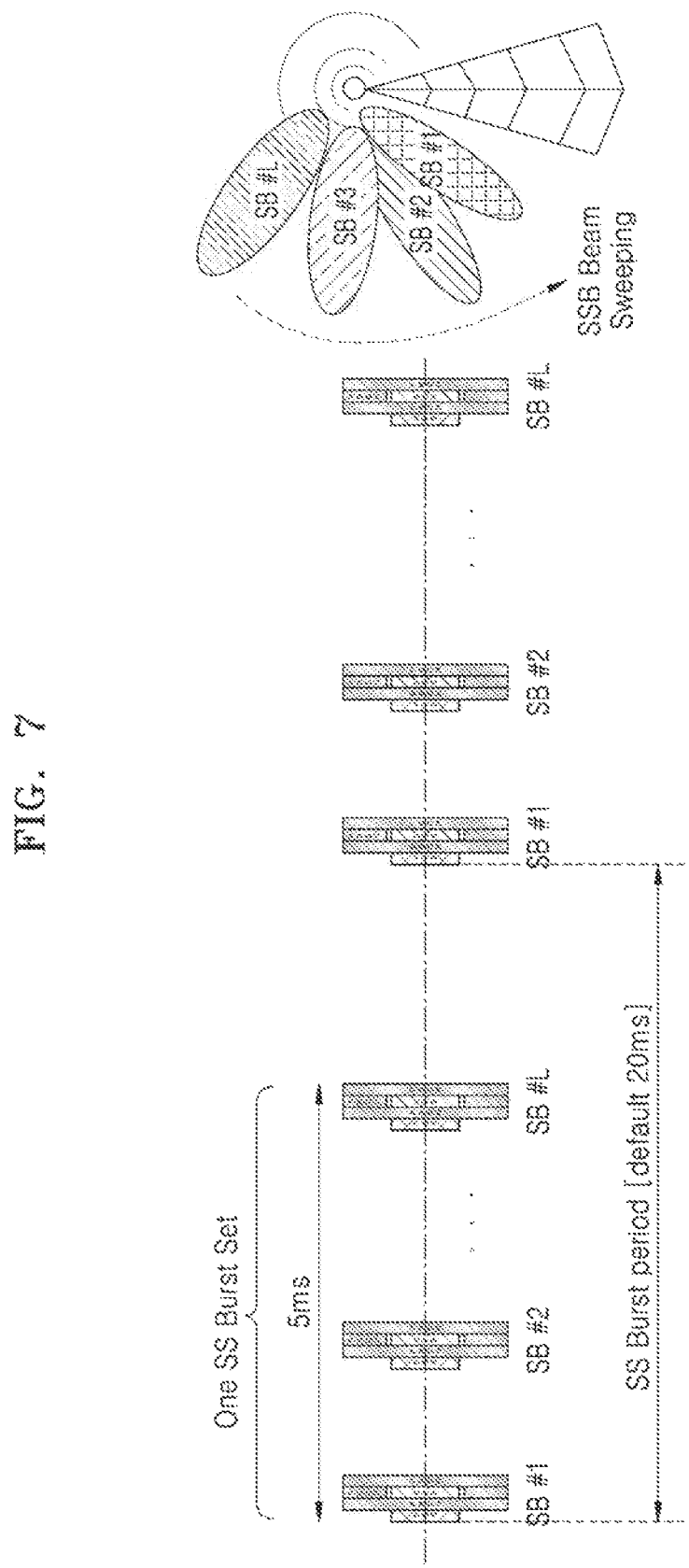
FIG. 7 illustrates a base station having a directional antenna outputting SS blocks according to an embodiment of the disclosure.

FIG. 3 is a ladder diagram for describing operations of a communication system, according to an embodiment of the disclosure. FIG. 4 illustrates an SS block output from a communication node. FIG. 5 illustrates an arrangement of SS blocks placed by a communication node based on a method of outputting a synchronization signal, according to an embodiment of the disclosure. FIGS. 6A and 6B are diagrams for comparing a frequency band allocation form according to an embodiment of the disclosure and a frequency band allocation form according to a traditional mobile communication method. FIG. 7 illustrates a BS having a directional antenna outputting SS blocks according to an embodiment of the disclosure.

Referring to FIG. 3, the terminal 200 may transmit information for communication connection to the communication node 300, in S100.

The terminal 200 may output the information for communication connection (hereinafter, communication connection information) to access (connect) the communication node 300 (BS 110 or the repeater 120). For example, the terminal 200 may output the communication connection information for initial communication connection, without being limited thereto. In another embodiment of the disclosure, the terminal 200 may periodically output the communication connection information even in an idle mode (e.g., null mode or sleep mode), enabling the communication node 300 to get ready to allocate a communication service for the terminal 200.

The communication connection information may include various information relating to a communication specification of the terminal 200. The communication specification may depend on communication-related hardware equipped in the terminal 200. For example, the communication connection information may include information about a frequency-in-use, available bandwidth and a detectable position (e.g., frequency band) of the SS block, etc., of the terminal 200.

The communication node 300 may identify the detectable position information of the SS block of the terminal 200 from the received information, in S110. The communication node 300 may set a position of the SS block based on the identified position in S120, and may output the SS block based on the set position in S130.

The communication node 300 may identify the detectable position of the SS block from the communication connection information received from the terminal 200. The detectable position of the SS block may refer to a frequency band in which the terminal 200 is able to receive the SS block. In another embodiment of the disclosure, the detectable position may include a plurality of continuous or discrete frequency bands.

The communication node 300 may set a position ((an OFDM symbol position, a subcarrier position, etc.) of the SS block based on the identified position, and output the SS block based on the set position. In some embodiments of the disclosure, in a case that the identified position corresponds to a plurality of frequency bands, the communication node 300 may select a frequency in one of the identified frequency bands, and set a position of the SS block so that the SS block is output at the selected frequency. For example, the communication node 300 may select a frequency in one frequency band based on whether the identified frequency bands are occupied by other terminals, load conditions of the frequency bands, etc.

The terminal 200 may receive the SS block output from the communication node 300 and decode the received SS block in S140. The terminal 200 may access the communication node 300 based on access information obtained by the decoding, in S150.

The terminal 200 may obtain the access information for making access to the communication node 300 by decoding the received SS block, and perform communication with the communication node 300 based on the access information obtained. In another embodiment of the disclosure where the communication node 300 is the repeater 120, a higher layer device (e.g., a BS) of the communication node 300 may include a database to identify a user of the terminal 200 and check usage and/or process charging. The communication node 300 may transmit information for identifying the terminal 200 and information about data usage of the terminal 200 to the higher layer device, which may in turn identify a user of the terminal 200 and monitor data usage of the user (or the terminal) based on the received information and the database.

Referring first to FIG. 4 in relation to the embodiment of FIG. 3, an SS block may include a PSS block, an SSS block, and a physical broadcast channel (PBCH) block. Each of the PSS block and the SSS block occupies one OFDM symbol and 127 subcarriers, and the PBCH block is formed across three OFDM symbols and 240 subcarriers.

The PSS block and the SSS block may include information of an identity (ID) for identifying a BS (or cell), e.g., a physical layer cell ID (PCI). For example, the PCI may be comprised of a combination of the PSS and the SSS. The terminal 200 may recognize which cell the terminal 200 belongs to and determine a starting point of a frame to be in sync with the BS (or the repeater), based on the PSS block and the SSS block included in the received SS block.

The PBCH block may include a master information block (MIB) that contains random access information of the BS. The terminal 200 may decode the MIB included in the PBCH block in the received SS block, to obtain various information (e.g., a frame number) required for detecting a signal transmitted from the BS (or the repeater).

Based on the information obtained from the SS block, the terminal 200 may perform communication with the BS (or the repeater).

Referring to an embodiment of FIG. 5, upon receiving the communication connection information from each of a plurality of terminals 200, the communication node 300 may arrange the respective SS blocks for the terminals 200 in various positions. As shown, the communication node 300 may receive the communication connection information from each of a first terminal, a second terminal, a third terminal, and a fourth terminal, and obtain detectable position information of the SS block from the received connection information. The communication node 300 may arrange the SS block for each terminal in a different symbol and subcarrier position based on the information obtained, to make the SS block output in different frequency bands.

In accordance with an embodiment of the disclosure, the communication node 300 may be able to allocate an individual communication resource for the terminal 200 (e.g., a frequency band for data transmission or reception with the terminal 200) based on the frequency-in-use, the available bandwidth, and the SS block detectable position included in the communication connection information of the terminal 200.

In this regard, referring to FIG. 6A, in the traditional case as shown in FIG. 6A, it may be seen that frequency bands are divided for the respective operators. In this case, there are band guards between the operators' frequency bands, which may hinder frequency use efficiency. Furthermore, a manufacturer of the terminal 200 needs to manufacture a dedicated terminal including hardware that only supports a frequency band for a corresponding operator, or needs to manufacture a terminal including high-cost and high-power hardware that supports wideband. In addition, the user of the terminal 200 suffers from various problems, such as having difficulty in freely changing the communication operator.

On the other hand, referring to FIG. 6B, in accordance with an embodiment of the disclosure, the frequency band is not classified for each communication operator, and the communication node 300 may occupy a variable frequency band based on the communication connection information. In this case, there is no need for the guard band, so the frequency resource may be used more efficiently. Furthermore, the communication node 300 may allocate communication resources for the terminals 200 based on the frequency-in-use and the available bandwidth included in the communication connection information of the terminal 200. Accordingly, the terminal 200 is less required to have hardware for processing wideband signals, thereby having less power consumption and a reduced manufacturing cost. Moreover, even the traditional terminal having hardware capable of processing narrowband signals is able to perform smooth communication with the communication node 300.

Referring to FIG. 7, as the 5G NR uses a higher frequency band (3.5 GHz or 28 GHz) than in the traditional mobile communication method, cell coverage may be reduced due to a propagation path loss. To solve this, beamforming is applied to the 5G NR when the high frequency band is used. As for the beamforming, especially, a hybrid beamforming technology in which analog beamforming is used to cover the coverage and digital beamforming (DBF) is applied with overlapping analog beams may be used. By the nature of the analog beamforming with multiple antennas, a narrow antenna beam may be intensely transmitted far away in a particular direction, but fail to widely cover the entire cell at a time. Rather, in a case that an antenna beam is formed in one direction, antenna beams for the other directions are hardly made and the signal is not transmitted. Accordingly, in this case, a beam sweeping technology may be used by which the entire cell coverage is divided into multiple sections each corresponding to an analog beam and the cell coverage is all covered by sequentially rotating the beam.

Beams output according to the beam sweeping technology may be distinguished from one another by their unique indexes, and the terminal 200 may select a beam having the best reception performance (e.g., a beam with highest reception strength or highest reception rate) among the output beams. In an embodiment of the disclosure, once a beam is selected between a communication node (e.g., a BS) employing the beam sweeping technology and the terminal 200, the communication node 300 may set a position of the SS block output from the selected beam to correspond to the SS block detectable position of the terminal 200. In other words, the communication node 300 may set a different position of the SS block included in each beam based on the SS block detectable position of each of the terminals 200, and set the position variably according to changes in the position of the terminal 200. For example, when the first terminal is located in a section corresponding to the first beam, the communication node 300 may set a position of the SS block output from the first beam to correspond to the SS block detectable position of the first terminal. Subsequently, when the first terminal is moved from the section corresponding to the first beam to a section corresponding to the second beam, the communication node 300 may set a position of the SS block output from the second beam to correspond to the SS block detectable position of the first terminal.

According to embodiments of the disclosure, a communication node may set and output a position of an SS block based on information transmitted from a terminal, thereby helping the terminal minimize its load and time consumption in discovering the SS block.

Furthermore, unlike the traditional case where frequency bands are divided for each operator, the communication node may be implemented to allocate and provide a communication resource depending on a communication specification of each terminal, thereby maximizing frequency band usage efficiency. In this case, the terminal may not need to be equipped with high-power hardware capable of processing wideband signals, thereby reducing its power consumption, and even traditional terminals capable of processing narrowband signals may receive communication services from the communication node.

Effects according to technical ideas of the disclosure are not limited to what are described above, and throughout the specification it will be clearly appreciated by those of ordinary skill in the art that there may be other effects unmentioned.

The aforementioned embodiments are described merely for example with reference to the drawings for more thorough understanding of the disclosure, and should not be construed as limiting the technical idea of the disclosure.

In addition, it will be apparent to those of ordinary skill in the art to which the disclosure pertains that various changes and modifications can be made without departing from basic principles of the disclosure.

What is claimed is:

1. A method of outputting to a terminal a synchronization signal by a communication node, the method comprising:
receiving communication connection information from the terminal, the communication connection information comprising position information of a synchronization signal (SS) block for the terminal;
identifying the position information of the SS block included in the communication connection information;
setting a position of the SS block for the terminal based on the identified position information; and
outputting the SS block based on the set position,
wherein the setting of the position of the SS block for the terminal comprises, when a plurality of frequency bands for the SS block corresponding to the position information are identified, selecting a frequency band based on whether each of the plurality of frequency bands is occupied by another terminal.

2. The method of claim 1, wherein the setting of the position of the SS block comprises setting an orthogonal frequency division multiplexing (OFDM) symbol position and a subcarrier position of the SS block so that the SS block is output at a frequency included in a frequency band corresponding to the position information.

3. The method of claim 1, wherein the communication connection information comprises at least one of frequency-in-use information and available bandwidth information of the terminal.

4. The method of claim 3, further comprising: allocating a communication resource for communication with the terminal based on at least one of the frequency-in-use information and the available bandwidth information included in the communication connection information.

5. The method of claim 1, wherein the communication node comprises a base station or a repeater.

6. A communication node comprising:
a terminal information receiver configured to receive communication connection information from a terminal, the communication connection information comprising position information of a synchronization signal (SS) block for the terminal;
a terminal information processor configured to identify the position information of the SS block by processing the received communication connection information; and
an SS block output adjuster configured to set a position of the SS block for the terminal based on the position information, and output the SS block based on the set position,
wherein when a plurality of frequency bands corresponding to the position information are identified, the SS block output adjuster is further configured to select a frequency band based on whether each frequency band is occupied by another terminal.

7. The communication node of claim 6, wherein the SS block output adjuster is configured to set an orthogonal frequency division multiplexing (OFDM) symbol position and a subcarrier position of the SS block so that the SS block is output at a frequency included in a frequency band corresponding to the position information.

8. The communication node of claim 6, wherein the communication connection information comprises at least one of frequency-in-use information and available bandwidth information of the terminal.

9. The communication node of claim 8, wherein a communication resource for communication with the terminal is allocated based on at least one of the frequency-in-use information and the available bandwidth information included in the communication connection information.

10. The communication node of claim 6, wherein the communication node comprises a base station or a repeater.

* * * * *